United States Patent [19]

Meyer

[11] 4,244,076
[45] Jan. 13, 1981

[54] METHOD AND FORMING TOOL FOR THE FABRICATION OF A BRISTLE SUPPORT FOR A BRUSH, ESPECIALLY A HAIR BRUSH

[75] Inventor: Walter Meyer, Triengen, Switzerland

[73] Assignee: Trisa Bürstenfabrik AG, Triengen, Switzerland

[21] Appl. No.: 41,813

[22] Filed: May 23, 1979

[30] Foreign Application Priority Data

Jun. 16, 1978 [AT] Austria ................................ 4419/78

[51] Int. Cl.³ .............................................. A46B 1/00
[52] U.S. Cl. ..................................... 15/188; 264/243; 264/255; 264/328.7; 300/21
[58] Field of Search .......................... 15/186, 187, 188; 264/243, 255; 300/21; 425/123, 190

[56] References Cited

U.S. PATENT DOCUMENTS

| | | | |
|---|---|---|---|
| 1,465,919 | 8/1923 | Benson et al. | 264/243 X |
| 2,621,369 | 12/1952 | Gantz et al. | 264/243 X |
| 2,643,158 | 6/1953 | Baldanza | 425/123 X |
| 2,783,490 | 3/1957 | Kutik | 15/187 |
| 3,004,291 | 10/1961 | Schad | 264/243 X |

Primary Examiner—Christopher K. Moore
Attorney, Agent, or Firm—Werner W. Kleeman

[57] ABSTRACT

A method of, and apparatus for, fabricating a bristle support or carrier for a brush, especially a hair brush, having pin-like bristles is disclosed. In a first method step there are produced the rows of bristle pins interconnected with one another at their rear end by means of a web. The individual bristle pin rows are retained in their position after forming the same to accomplish the next method step. In this next or second method step the bristle pins, at the region of their rear end, together with the webs, are cast in the material of the bristle support, so that the bristle pin rows are embedded in the bristle support.

28 Claims, 5 Drawing Figures

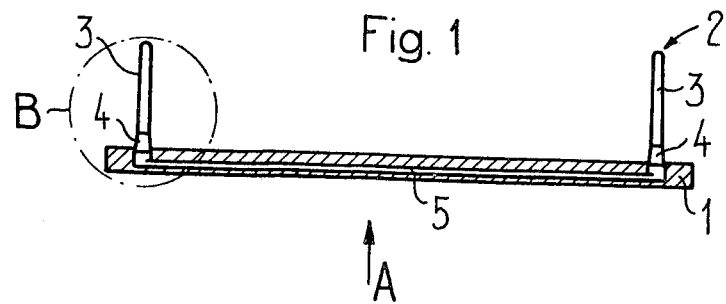
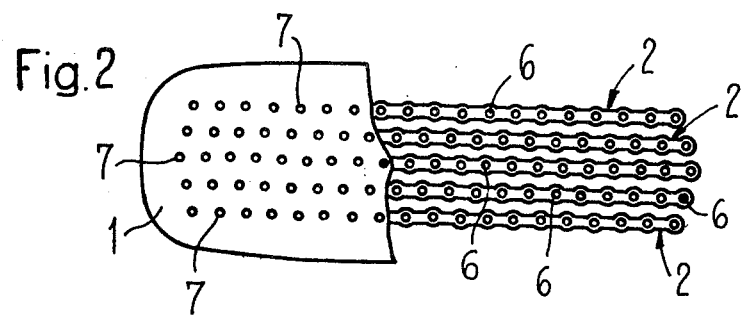
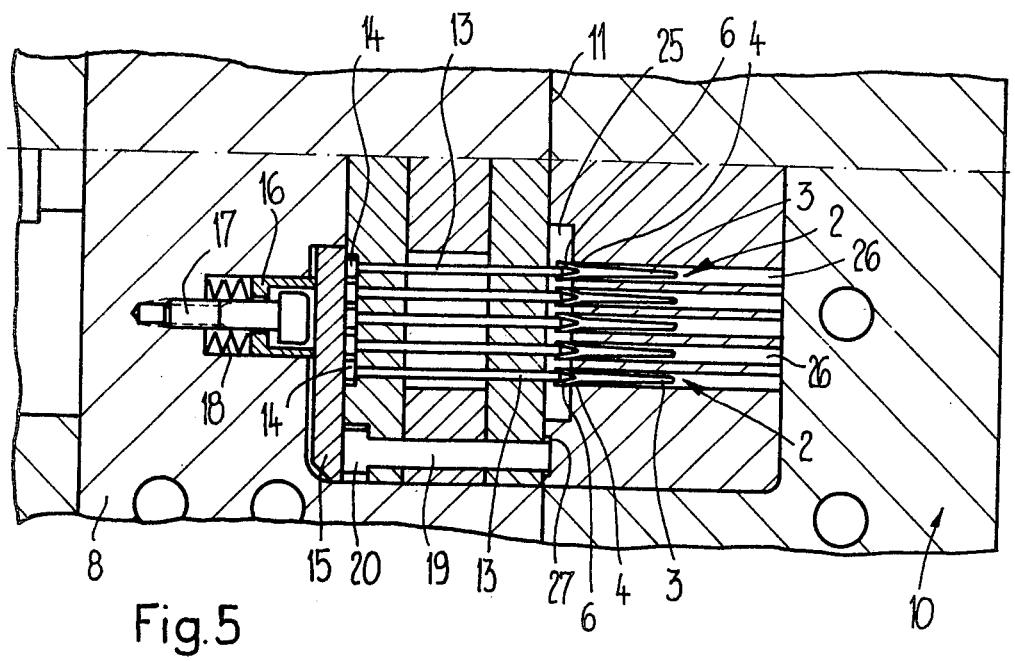

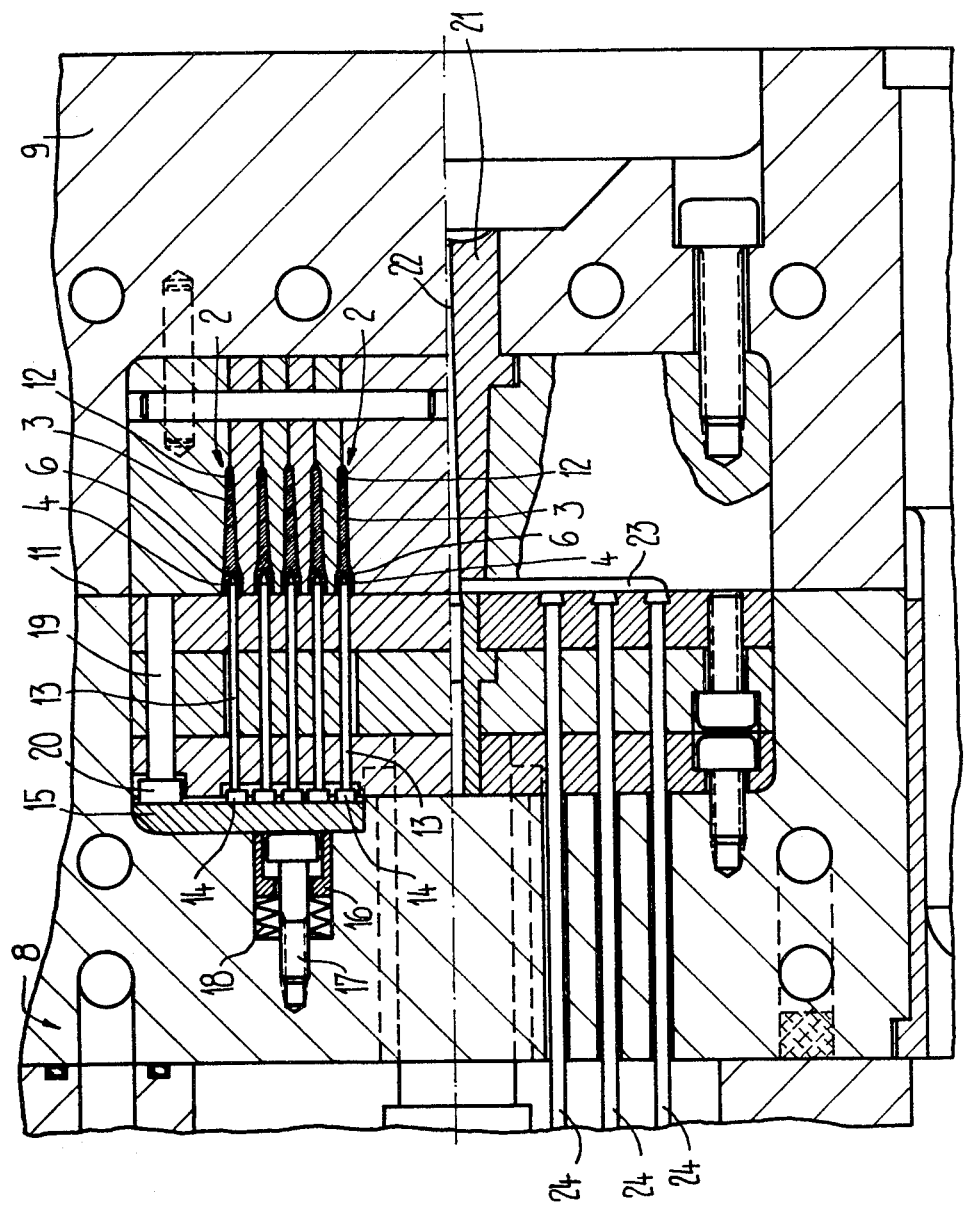

METHOD AND FORMING TOOL FOR THE FABRICATION OF A BRISTLE SUPPORT FOR A BRUSH, ESPECIALLY A HAIR BRUSH

BACKGROUND OF THE INVENTION

The present invention relates to a new and improved method of manufacturing a bristle support or carrier for a brush, especially hair brushes, wherein the bristle support is provided with spike or pin-like bristles. The invention further relates to a forming tool for the performance of the method and to a bristle support having pin-like bristles and fabricated in accordance with this method.

Generally speaking, when practising the invention initially there are fabricated the bristle pins or spikes formed of plastic material and connected in rows with one another at their rear end by means of a web, and thereafter, such bristle pins are mounted with the webs at the bristle support.

According to a state-of-the-art method for the fabrication of a bristle support equipped with pin-like or spike bristles for a hair brush, the individual bristle pins or bristles, formed of metal or plastic, are inserted into holes of a substantially plate-shaped rubber cushion. The bristle pins and the rubber cushion are fabricated independently of one another. So that during use there can be avoided any retraction of the bristle pins which are loosely inserted into the rubber cushion, a covering formed of textile material is attached to the rear face of the rubber cushion, against which bear the bristle pins at their rear end. This manufacturing method is therefore complicated, both from the standpoint of the work effort and time, and hence, expensive.

It is also known to the art to fabricate in one working operation rows of bristles, wherein the bristle pins of a row are mutually interconnected at their rear ends by means of a web. These bristle rows are then inserted into a rubber cushion previously provided with suitable holes or bores. At the section of the rubber cushion which supports the bristle rows there are mounted two side elements which engage below such section and must be laterally bent upwards in order to insert the bristle rows. With a rubber cushion which has been inserted into a bristle body the rows of bristles bear against such side elements, so that there is precluded any shifting back or retraction of the bristle rows during use. Also in this case the bristle pins and the rubber cushion are fabricated independently of one another. However, owing to the special construction of the rubber cushion both the fabrication of the latter and also the insertion of the bristle rows and the mounting of the rubber cushion, carrying such bristle rows, at the bristle body is rather complicated.

It has already been proposed, in the case of hair brushes having metallic bristle pins or bristles, to insert the individual metal pins or bristles in the desired arrangement into a mold in which the pins, at their rear end, are molded by the material of the bristle support, for instance rubber. In this way the bristles or pins are embedded into the bristle support, precluding any rearward shifting or displacement of the pin-like bristles. Still, also this method is equally time consuming and complicated to carry out procedurally, especially owing to the need to supply, in the required correct position, the individual metal pins or bristles into the mold.

SUMMARY OF THE INVENTION

Therefore, with the foregoing in mind, it is a primary object of the present invention to provide an improved method of, and apparatus for, fabricating a bristle support for a brush, especially but not exclusively, hair brushes, the bristle support being provided with pin-like bristles, in a manner not associated with the aforementioned drawbacks and limitations of the prior art proposals.

Yet a further significant object of the present invention aims at the provision of a novel method and forming tool for fabricating bristle supports in a highly reliable, effective and efficient manner, both from the standpoint of economies in the working operations and the fabrication costs.

Another significant object of the present invention is to provide a method of the previously mentioned type, and further, a forming tool for the performance of such method, wherein with the aid of simple means there can be automatically fabricated a bristle support for a brush, the bristle support being provided with pin-like bristles, wherein there is effectively avoided any undesired displacing back or inward shifting of the bristle rows.

Now in order to implement these and still further objects of the invention, which will become more readily apparent as the description proceeds, the invention contemplates retaining the bristle pins or bristles, at their rear end connected with the web, in their mutual relative position to one another, and at the region of such rear end molding such bristles together with the webs by the material of the bristle support.

The bristle pins or bristles which are fabricated in rows in a first working step and interconnected by a web at their rear ends, after such fabrication, are retained at such rear ends, preferably from the rear side, and thereafter the material of the bristle support is cast or molded about such bristle ends and their related web. In this way it is possible to simplify the total manufacturing operation and also to automate the same.

According to a preferred aspect of the invention, each bristle pin or bristle is retained by an essentially coaxial mandrel or equivalent structure, releasably engaging at the rear end of the bristle pin. Advantageously, the mandrel, during the fabrication of the bristle pin, is removably cast or molded therein. Due to this support or mounting of the bristles there is insured, on the one hand, a positive retention of such bristles or bristle pins in their mutual position and easy removal of the mandrel, and, on the other hand, there is also rendered possible a shifting of the bristle pins, so that the latter, at their rear end, together with the webs, can have the material of the bristle support molded or cast thereabout.

The forming tool for the performance of such method as contemplated by the invention is manifested by the features that there is provided a first mold half and two second mold halves. Initially, one of the second mold halves for fabricating the rows of bristle pins interconnected at their rear ends by means of a web and, thereafter, the other of the second mold halves provided with a hollow molding compartment for forming the bristle support and serving to embed the bristle pins together with the webs in the bristle support, each are brought into cooperative relationship with the first mold half. This first mold half is provided with a holder device for the releasable retention of the bristle pins or bristles at their rear ends connected with the web. By means of this holder device the bristle pins or bristles are displaced, with their rear ends and the webs, away from the mold parting plane into the hollow mold compartment of the aforementioned other second mold half, so that the rear ends of the bristle pins and the webs, during penetration of the material of the bristle support into the aforementioned hollow mold compartment, are surrounded by such material.

This type of forming tool or mold arrangement, enables fabricating the bristle support with the embedded spike or pin-like bristles at the same machine with two injection molding operations or steps.

Preferably, the aforementioned one of the two mold halves is provided with hollow mold compartments for producing the rows of bristle pins or bristles. The holder device advantageously contains mandrels displaceably guided in their lengthwise direction in the first mold half, protruding at the mold separation plane past the first mold half and extending into the hollow mold compartments of the second mold halves. Each of these mandrels serves for the releasable support or retention of an aligned bristle pin or bristle. There is also provided a displacement device for displacing the mandrels. For the fabrication of the bristle support the displacement device advances the mandrels, together with the bristle pins retained thereby, from a rear position into a front position. This preferred construction of the forming tool or mold arrangement, renders possible rational and completely automated production of the bristle support together with the bristle pins or bristles.

The bristle support fabricated according to the aforementioned method and having pin-like bristles, is manifested by the features that there are provided rows of bristle pins or bristles formed of plastic, these rows extending essentially parallel to one another. The bristle pins or spikes are connected at their rear ends by means of a web or equivalent structure with one another and, at the region of such rear ends, are embedded together with the related webs into a bristle support. Advantageously, the bristle support has an essentially plate-shaped configuration and is composed of an elastic material, for instance rubber or plastic, rendering possible easy insertion of the bristle support together with the pin-like bristles into a brush body and affording a resilient supporting action for the bristle pins or bristles.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a longitudinal sectional view through a bristle support or a carrier having embedded therein rows of bristle pins or bristles;

FIG. 2 is a bottom plan view of the bristle support and the bristle rows looking in the direction of the arrow A of FIG. 1;

FIG. 4 is a fragmentary sectional view through part of the forming tool for molding the bristle rows; and FIG. 5 is a fragmentary sectional view of part of a molding tool for molding the bristle support or carrier.

DETAILED DESCRIPTION OF THE PREFERRED EMBODIMENTS

Figure 3:
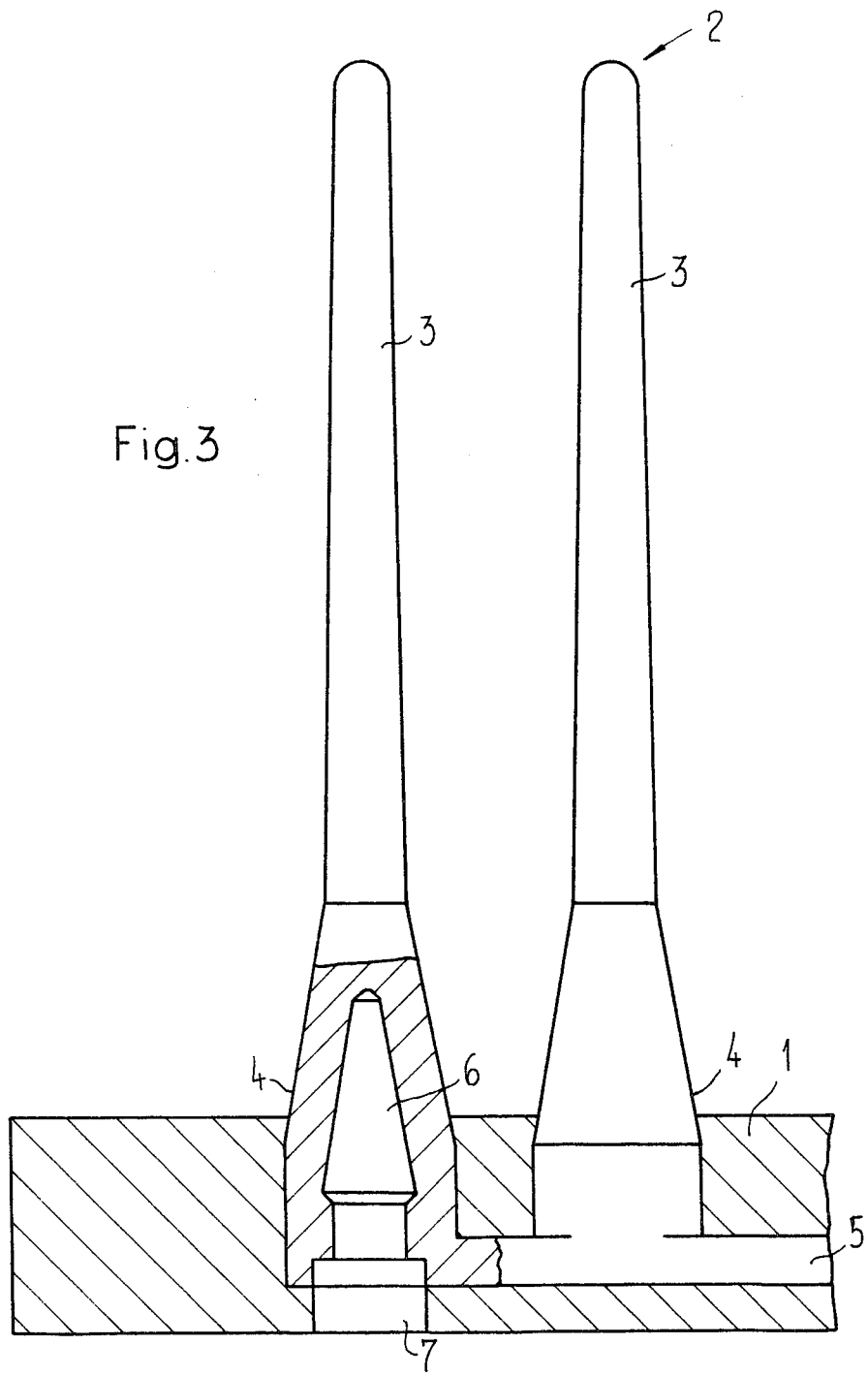
FIG. 3 is an enlarged view of the region B shown in FIG. 1.

Describing now the drawings, FIG. 1 shows in sectional side view and FIG. 2 shows in bottom plan view a substantially plate-shaped bristle support or carrier 1 in which there are embedded rows 2 of bristle pins or bristles 3. The bristle support or carrier 1 advantageously consists of an elastic material, for instance is formed of rubber or a soft plastic. The bristle pin rows 2 extend approximately parallel to one another in the lengthwise direction of the bristle support 1, as clearly evident by referring to FIG. 2. The bristle pins or bristles 3 of a row 2 are interconnected with one another at their rear ends 4 by means of a related web or strap 5 or equivalent structure. The bristle pins 3 of a row 2 are formed of one-piece with the connection web 5 and consist of a standard hard plastic material. The spike or pin-like bristles 3 conically taper at their free ends or tips and are enlarged or widened at their rear ends 4. At the rear end 4 of each bristle pin or bristle 3 there is provided a recess 6, the significance of which will be explained more fully hereinafter. Furthermore, at their rear ends 4 the bristle pins 3 together with the related web 5 are enclosed by the material from which there is formed the bristle support or carrier 1, so that the bristle pins 3 are retained non-displaceably in the bristle support 1.

Continuing, and as best seen by referring to FIGS. 2 and 3 openings or bores 7 are provided in the bristle support 1, each such opening 7 being aligned with a recess 6 of a bristle pin or bristle 3. The bristle support or carrier 1, together with the therein embedded bristle pins or bristles 3, are mounted in a not particularly illustrated, conventional brush body of known design such that, the bristle support 1 is domed or arched transversely with respect to the lengthwise extent of the bristle pin rows 2. In this way there is achieved the beneficial result that the bristle support 1 can elastically yield when pressure forces are exerted upon the bristle pins or bristles 3.

Now in FIGS. 4 and 5 there is shown in sectional view, extending perpendicular to the lengthwise extent of the bristle pin rows 2, a forming tool or mold arrangement for the fabrication of the pin rows 2 (FIG. 4) and for the fabrication of the bristle support 1 (FIG. 5). This forming tool, which in the exemplary embodiment under discussion constitutes an injection molding tool or injection mold, comprises a first mold half 8 and two second mold halves 9 and 10. In the portrayed closed condition of the forming tool or mold arrangement 8-10, both of the mold halves 8 and 9 (FIG. 4) and 8 and 10 (FIG. 5) bear against one another at the mold separation plane 11. As best seen by referring to FIG. 4, the mold half 9 possesses hollow mold compartments or cavities 12 for forming the juxtapositioned rows 2 of bristle pins 3, which, at their rear ends 4, as shown in FIGS. 1 to 3, are interconnected with one another by a related web or strap 5. These hollow mold compartments 12 are open in the direction of the mold separation or parting plane 11.

At the other mold half 8 there are displaceably guided, parallel to one another, the mandrels 13, the number of which corresponds to the number of bristle pins or bristles 3. These mandrels 13 protrude, at the mold separation or parting plane 11, past the mold half 8 and project into the hollow mold compartments 12 of the mold half 9. These mandrels 13 are arranged coaxially with respect to the bristle pins or bristles 3 which are to be formed in the hollow mold compartments 12 and can be shifted in a direction extending perpendicular to the mold separation plane 11. At the bristle ends protruding beyond the mold separation plane 11 the mandrel or peg members 13 carry a substantially cone-shaped tip. At their other, rear ends 4 the mandrels 13 bear by means of thier not particularly referenced heads upon a movable plate 15 constructed as a counter support. This movable plate or plate member 15 is displaceably guided in the mold half 8 in the direction of displacement of the mandrels 13 and bears upon a support element 16 which is displaceably guided by a threaded bolt 17 or equivalent structure. This support element 16 bears upon a set of pressure or compression springs 18 housed in the mold half 8. This set or package of compression springs 18 produces, by means of the support element 16, a pressure or compression force at the plate 15, by means of which this plate 15, and thus, also the mandrels 13 are shifted from a rear position into a front terminal position. As best seen by referring to FIG. 4, opposing this pressure or compression force is a bolt 19 which bears by means of its head 20 at the plate or plate member 15. This bolt 19 is displaceably mounted in the mold half 8 and, in the closed state of the forming tool or mold arrangement, is pressed by the other mold half 9 into the rear terminal or end position, where it retains the plate 15, and thus, also the mandrels 13 connected therewith, in the rear terminal position.

As best seen by referring to the lower half of the showing of FIG. 4, there is provided at the mold half 9 a sprue insert 21 having a runner or channel 22. Additionally, there are provided at the mold half 9 distrubutor channels 23 which flow communicate with the runner 22 and are open in the direction of the mold separation or parting plane 11. Ejectors 24 are provided in conventional manner in the mold half 8, these ejectors 24 serving for removal of the material from the fabricated bristle or pin rows 2 which has solidified in the runner 22 and in the distributor channels 23.

The forming tool shown in its closed condition in FIG. 5 will be seen to comprise the mold half 8, corresponding to the mold half 8 fo FIG. 4, and the mold half 10 which is somewhat differently structured than the mold half 9 of FIG. 4. This mold half 10 possesses a recess or compartment 25 which opens in the direction of the mold separation or parting plane 11. Recess 25 serves to receive the material of the bristle support or carrier 1. Additionally, recesses 26 are provided in the mold half 10 and serve to receive the fabricated bristle pins or bristles 3. In the surface of the mold half 10, located at the mold separation plane 11, there is provided a depression 27 which is aligned with the bolt 19 and with which there can engage such bolt 19. This engagement is accomplished under the action of the pressure of the set of compression or pressure springs 18, which press the plate 15. and thus the mandrels 13 and the bolt 19, into the front terminal or end position. Owing to this depression or inset portion 27 the bolt 19, in contrast to FIG. 4, cannot oppose the pressure action of the set of the set of compression springs 18.

Now based upon the showing of the molding arrangement or forming tool of FIGS. 4 and 5 there will be explained hereinafter the manufacturing method of the present invention.

Initially, both of the mold halves 8 and 9 are brought together, as shown in FIG. 4. Consequently, as already mentioned, the bolt 19 or equivalent structure is pressed by the mold half 9 towards the rear, against the action of the set of compression springs 18, so that the plate 15 and along therewith also the mandrels 13 are moved back into their rear end or terminal position. Also in this rear end position the mandrels 13 protrude past the mold separation or parting plane 11 and extend, by a certain amount, into the hollow mold compartments 12 of the mold half 9. Upon supplying the plastic molding mass into such hollow mold compartments 12 there are now formed the essentially parallel rows 2 of bristle pins or bristles 3, which, at their ends confronting the mold separation plane 11, are interconnected with one another by a related web 5. Hence, the protruding ends of the mandrels 13 have molded thereabout the plastic molding mass or compound. After solidification or setting of the molding compound or mass, the mold half 9 is raised from the mold half 8. by means of the ejectors 24 the material in the runner 22 and in the distributor channels 23 is separated from the rows 2 of the pin-like bristles 3. The bristle pins 3 are, however, fixedly retained in their mutual position by the mandrels 13, since the front ends of such mandrels 13 engage in a push-button or snap-action like manner into the recesses at the rear ends 4 of the bristle pins 3. Since the bolt 19 no longer is displaced back into its rear end position by the mold half 9, the set or package of compression springs 18 can displace the plate 15, the bolt 19 and the mandrels 13 together with the bristle pins 13 into the front end position, where the bristle pins 3 terminate at a spacing from the plane of the mold half 8 located at the mold separation plane 11.

During the next work operation or step the other mold half 10 is brought together with the mold half 8, as best seen by referring to FIG. 5. Consequently, the bristle pins 3 engage into the recesses 26 in the mold half 10. Due to the depression 27, as already mentioned, the bolt 19 is not pushed into its rear end positions, rather, together with the mandrels 13, remains in the front end or terminal position. In this front end position the bristle pins 3 are raised at their rear ends 4 from the mold separation or parting plane 11 by an amount corresponding to the displacement of the mandrels 13. These rear ends 4 of the bristle pins or bristles 3 are thus, and as clearly shown in FIG. 5, freely situated in the hollow mold compartment or chamber 25 of the mold half 10. Consequently, there is positively insured that the material of the bristle support or carrier 1, which has been infed into such hollow mold compartment 25, can encapsulate the bristles 3 at the region of their rear ends 4 together with the webs 5. Hence, the bristles 3 are securely embedded in the material of the bristle support 1 at the region of their rear ends 4 together with their webs 5. After the solidification of the molding material which has been introduced into the hollow mold compartment 25, the mold half 10 is then raised, so that the bristle support 1 together with the embedded bristle pins or bristles 3 is exposed or laid free. This final product now can be easily detached from the mandrels 13.

The recess 6 at the rear end 4 of each bristle pin or bristle 3 and the therewith aligned opening or bore 7 in the bristle support 1 are formed as a result of the mandrels 13 which, during the manufacturing operation, retain the bristle pins or bristles 3 at their rear side.

The bristle support 1 together with the embedded bristles 3 can be fabricated both by injection molding techniques and also by transfer molding. The described method and the illustrated forming tool allows for a simple and automatic infeed of the molding compound or mass for the bristle pins or bristles 3 and the web 5 and the bristle support 1. Moreover, the bristle support 1 together with the bristles 3 can be fabricated at the same machine during two injection operations, and such manufacturing process can be automated. This is possible, among other things, by the fact that during a first step or operation, as shown in FIG. 4 the bristle rows 2 already are produced in their desired mutual position, and for the subsequent fabrication of the bristle support 1 by means of the mandrels 13 are retained in such mutual position. By exchanging the mold half 9 by the mold half 10 and by slightly forwardly shifting or advancing the bristle pins or bristles 3, it is possible to embed the bristles 3 at their rear ends 4 together with their webs in a most simple manner in the material of the bristle support or carrier 1.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A method of manufacturing a bristle support for a brush, especially a hair brush, the bristle support being provided with rows of substantially pin-like bristles, comprising the steps of:

forming the bristles of a plastic material such that the rear end of the bristles are interconnected with one another in bristle rows by means of a related web means;

retaining the bristles at their rear ends connected with the web means in thier mutual position with respect to one another; and molding material of a bristle support about the region of the rear ends of the bristles together with their web means, to thereby form the bristle support while anchoring the rows of bristles together with their web means in the material from which there is formed the bristle support.

2. The method as defined in claim 1, wherein:

the step of retaining the bristle encompasses holding the bristles for the molding operation, in a position essentially corresponding to the position which the bristles assume following the fabrication of such bristles.

3. The method as defined in cliam 2, wherein:

the step of retaining said bristles encompasses holding the bristles at a rear portion thereof.

4. The method as defined in cliam 1, wherein:

the step of retaining the bristles encompasses holding the bristles at their rear ends.

5. The method as defined in claim 4, including the steps of:

holding each bristle by means of a mandrel arranged essentially coaxially with respect to the retained bristle; and said mandrel releasably engaging into the rear end of the related bristle.

6. The method as defined in claim 5, further including the steps of:

detachably embedding part of each mandrel in its related bristle during the formation of the bristles by molding.

7. The method as defined in claim 1, wherein:

the bristles, web means and bristle support are molded by injection molding techniques.

8. The method as defined in claim 1, wherein:

the bristles, web means and bristle support are molded by transfer molding.

9. The method as defined in claim 1, further including the steps of:

using an elastic material for molding the bristle support.

10. The method as defined in claim 9, wherein:

said elastic material is rubber.

11. the method as defined in claim 9, wherein:

said elastic material is plastic.

12. A forming tool arrangement for fabricating a bristle support for a brush, especially a hair brush, the bristle support being provided with bristles having rear ends, comprising:

a first mold half;

two second mold halves defining first and second mold means;

said first mold means cooperating with said first mold half to form a first mold assembly for producing in said first mold means rows of bristles interconnected at their rear ends by means of a related web;

said second mold means, after the molding operation in the first mold assembly, being brought into coacting relationship with said first mold half to form a second mold assembly;

said second mold means having a hollow mold compartment for forming the bristle support in order to embed the rows of bristles together with their webs in the bristle support;

a holder device provided for said first mold half for releasably holding the bristles at their rear ends connected with the related web;

said holder device serving to displace said bristles by means of their rear ends and the webs away from a mold separation plane into said hollow mold compartment of said second mold means, so that the rear ends of said bristles and said webs, upon infeed of material for forming the bristle support into said hollow mold compartment, are enclosed by said material.

13. The forming tool arrangement as defined in claim 12, wherein:

said first mold means is provided with hollow mold compartments for fabricating said rows of bristles.

14. The forming tool arrangement as defined in claim 13, wherein:

said holder device includes mandrels displaceably guided in their lengthwise direction in said first mold half;

said mandrels protruding in the mold separation plane past the first mold half and into the hollow mold compartments of said second mold halves;

each of said mandrels serving for the releasable retention of an aligned bristle;

a displacement device for displacing the mandrels; and said displacement device, for fabrication of the bristle support, displacing the mandrels together with the bristles retained by said mandrels out of a rear position into a front position.

15. The forming tool arrangement as defined in claim 14, wherein:

said displacement device includes spring means for exerting a spring force retaining the mandrels in thier front position and upon assembly of said first mold half and said first mold means displacing the mandrels back into their rear position.

16. The forming tool arrangement as defined in claim 15, wherein:
said displacement device further includes counter support means for supporting said mandrels at their rear ends;
said spring means comprising at least one spring exerting a force against which there is displaceable said counter support means by means of said displacement device upon closing said first mold half and said first mold member.

17. The forming tool arrangement as defined in claim 16, wherein:
said displacement device further comprises bolt member displaceably guided in said first mold half;
said bolt member engaging at said counter support means;
said at least one spring exerting a force upon said bolt member in order to cause said bolt member to protrude in the mold separation plane past the first mold half;
said bolt member, when assembling said first mold half and said first mold means to form said first mold assembly, being displaceable by said first mold means against the force of said at least one spring; and
said bolt member, when assembling the first mold half and said second mold means to form said second mold assembly, engaging by means of a protruding end thereof into a depression of said second mold means.

18. The forming tool arrangement as defined in claim 12, wherein:
each of said mold assemblies is structured for injection molding.

19. The forming tool arrangement as defined in claim 12, wherein:
each of said molding assemblies is structured for transfer molding.

20. The product produced according to the method of claim 1.

21. A bristle support for bristles of a brush, comprising:
essentially mutually parallel rows of bristles formed of plastic;
each of said bristles having a rear end;
each row of bristles being mutually interconnected at their rear ends by means of a related web; and
a bristle support in which there are embedded the rows of bristles together with their webs at the rear ends of said bristles.

22. The bristle support as defined in claim 21, wherein:
the bristle support has openings aligned with said bristles.

23. The bristle support as defined in claim 22, wherein:
said bristles have recesses at their rear ends which are in alignment with said openings.

24. The bristle support as defined in claim 23, wherein:
said bristles have widened portions at their rear ends provided with said recesses.

25. The bristle support as defined in claim 21, wherein:
said bristle support possesses a substantially plate-shaped configuration.

26. The bristle support as defined in claim 21, wherein:
said bristle support is formed of an elastic material.

27. The bristle support as defined in claim 26, wherein:
said elastic material is rubber.

28. The bristle support as defined in claim 26, wherein:
said elastic material is a plastic.

* * * * *